United States Patent
Droux et al.

(10) Patent No.: US 7,742,474 B2
(45) Date of Patent: Jun. 22, 2010

(54) VIRTUAL NETWORK INTERFACE CARDS WITH VLAN FUNCTIONALITY

(75) Inventors: Nicolas G. Droux, Rio Rancho, NM (US); Sunay Tripathi, San Jose, CA (US); Kais Belgaied, Sunnyvale, CA (US)

(73) Assignee: Oracle America, Inc., Redwood Shores, CA (US)

( * ) Notice: Subject to any disclaimer, the term of this patent is extended or adjusted under 35 U.S.C. 154(b) by 468 days.

(21) Appl. No.: 11/479,998

(22) Filed: Jun. 30, 2006

(65) Prior Publication Data

US 2008/0002736 A1  Jan. 3, 2008

(51) Int. Cl.
*H04L 12/28* (2006.01)
(52) U.S. Cl. ...................... 370/389; 370/401
(58) Field of Classification Search .............. 70/252, 70/254, 255, 389, 392, 397, 399, 395.3, 395.52, 70/400, 401, 409
See application file for complete search history.

(56) References Cited

U.S. PATENT DOCUMENTS

| | | | |
|---|---|---|---|
| 6,041,053 A | 3/2000 | Douceur et al. | |
| 6,070,219 A | 5/2000 | McAlpine et al. | |
| 6,131,163 A | 10/2000 | Wiegel | |
| 6,163,539 A | 12/2000 | Alexander et al. | |
| 6,477,643 B1 | 11/2002 | Vorbach et al. | |
| 6,600,721 B2 | 7/2003 | Edholm | |
| 6,714,960 B1 | 3/2004 | Bitar et al. | |
| 6,757,731 B1 | 6/2004 | Barnes et al. | |
| 6,831,893 B1 | 12/2004 | Ben Nun et al. | |
| 6,859,841 B2 | 2/2005 | Narad et al. | |
| 6,944,168 B2 | 9/2005 | Paatela et al. | |
| 6,990,106 B2 * | 1/2006 | Bhatia | 370/395.53 |
| 7,046,665 B1 * | 5/2006 | Walrand et al. | 370/392 |
| 7,146,431 B2 | 12/2006 | Hipp et al. | |
| 7,177,311 B1 | 2/2007 | Hussain et al. | |
| 7,260,102 B2 | 8/2007 | Mehrvar et al. | |
| 7,313,142 B2 | 12/2007 | Matsuo et al. | |
| 2002/0052972 A1 | 5/2002 | Yim | |
| 2003/0037154 A1 | 2/2003 | Poggio et al. | |
| 2004/0210623 A1 * | 10/2004 | Hydrie et al. | 709/201 |
| 2004/0267866 A1 | 12/2004 | Carollo et al. | |
| 2005/0111455 A1 * | 5/2005 | Nozue et al. | 370/392 |
| 2005/0135243 A1 | 6/2005 | Lee et al. | |
| 2005/0138620 A1 | 6/2005 | Lewites | |
| 2005/0207407 A1 * | 9/2005 | Baumberger | 370/389 |
| 2006/0041667 A1 | 2/2006 | Ahn et al. | |
| 2006/0045089 A1 * | 3/2006 | Bacher et al. | 370/392 |

(Continued)

OTHER PUBLICATIONS

"Solaris Networking—The Magic Revealed (Part I)"; Sunay Tripathi's Solaris Networking Weblog; Nov. 14, 2005, pp. 1-22 (22 pages).

(Continued)

*Primary Examiner*—Hong Cho
(74) *Attorney, Agent, or Firm*—Osha • Liang LLP

(57) ABSTRACT

A method for receiving incoming packets associated with a virtual Local Area Network (VLAN) includes receiving an incoming packet, classifying the incoming packet based on a VLAN tag embedded in the incoming packet, wherein the VLAN tag corresponds to the VLAN, and passing the incoming packet to a virtual network interface card (NIC) based on the VLAN tag.

17 Claims, 3 Drawing Sheets

U.S. PATENT DOCUMENTS

2006/0070066 A1    3/2006    Grobman
2006/0173970 A1*    8/2006    Pope et al. ................. 709/216
2006/0174324 A1    8/2006    Zur et al.
2007/0171904 A1*    7/2007    Tchigevsky ................ 370/389

OTHER PUBLICATIONS

Dovrolis, C., Thayer, B. and Ramanathan P.: "HIP: Hybrid Interrupt—Polling for the Network Interface", ACM SIGOPS Operating Systems Review, vol. 35, Iss. 4, Oct. 2001, 11 pages.

* cited by examiner

VIRTUAL NETWORK INTERFACE CARDS WITH VLAN FUNCTIONALITY

CROSS-REFERENCE TO RELATED APPLICATIONS

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" with U.S. application Ser. No. 11/112,367 (Patented) ; "Method and Apparatus for Consolidating Available Computing Resources on Different Computing Devices" with U.S. application Ser. No. 11/112,368; "Assigning Higher Priority to Transactions Based on Subscription Level" with U.S. application Ser. No. 11/112,947; "Method and Apparatus for Dynamically Isolating Affected Services Under Denial of Service Attack" with U.S. application Ser. No. 11/112,158; "Method and Apparatus for Improving User Experience for Legitimate Traffic of a Service Impacted by Denial of Service Attack" with U.S. application Ser. No. 11/112,629; "Method and Apparatus for Limiting Denial of Service Attack by Limiting Traffic for Hosts" with U.S. application Ser. No. 11/112,328; "Hardware-Based Network Interface Per-Ring Resource Accounting" with U.S. application Ser. No. 11/112,222; "Dynamic Hardware Classification Engine Updating for a Network Interface" with U.S. application Ser. No. 11/112,934; "Network Interface Card Resource Mapping to Virtual Network Interface Cards" with U.S. application Ser. No. 11/112,063; "Network Interface Decryption and Classification Technique" with U.S. application Ser. No. 11/112,436; "Method and Apparatus for Enforcing Resource Utilization of a Container" with U.S. application Ser. No. 11/112,910; "Method and Apparatus for Enforcing Packet Destination Specific Priority Using Threads" with U.S. application Ser. No. 11/112,584; "Method and Apparatus for Processing Network Traffic Associated with Specific Protocols" with U.S. application Ser. No. 11/112,228.

The present application contains subject matter that may be related to the subject matter in the following U.S. applications filed on Sep. 14, 2005, and assigned to the assignee of the present application: "Method and Apparatus for Monitoring Packets at High Data Rates" with U.S. Application Ser. No. 11/226,790.

The present application contains subject matter that may be related to the subject matter in the following U.S. applications filed on Oct. 21, 2005, and assigned to the assignee of the present application: "Method and Apparatus for Defending Against Denial of Service Attacks" with U.S. Application Ser. No. 11/255,366; and "Router Based Defense Against Denial of Service Attacks Using Dynamic Feedback from Attacked Host" with U.S. application Ser. No. 11/256,254.

The present application contains subject matter that may be related to the subject matter in the following U.S. applications filed on Jun. 30, 2006, and assigned to the assignee of the present application: "Network Interface Card Virtualization Based On Hardware Resources and Software Rings" with U.S. application Ser. No. 11/479,046; "Method and System for Controlling Virtual Machine Bandwidth" with U.S. application Ser. No. 11/480,000; "Virtual Switch" with U.S. application Ser. No. 11/480,261; "System and Method for Virtual Network Interface Cards Based on Internet Protocol Addresses" with U.S. application Ser. No. 11/479,997; "Virtual Network Interface Card Loopback Fastpath" with U.S. application Ser. No. 11/479,946; "Bridging Network Components" with U.S. application Ser. No. 11/479,948; "Reflecting the Bandwidth Assigned to a Virtual Network Interface Card Through Its Link Speed" with U.S. application Ser. No. 11/479,161; "Method and Apparatus for Containing a Denial of Service Attack Using Hardware Resources on a Virtual Network Interface Card" with U.S. application Ser. No. 11/480,100; "Method and Apparatus for Dynamic Assignment of Network Interface Card Resources" with U.S. application Ser. No. 11/479,817; "Generalized Serialization Queue Framework for Protocol Processing" with U.S. application Ser. No. 11/479,947; "Serialization Queue Framework for Transmitting Packets" with U.S. application Ser. No. 11/479,143.

BACKGROUND

Network traffic is transmitted from a network, such as the Internet, from a sending system (e.g., a computer system) to a receiving system (e.g., a computer system) via a network interface card (NIC). The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

Each of the packets sent between the sending system and receiving system is typically associated with a connection. The connection ensures that packets from a given process on the sending system reach the appropriate process on the receiving system. Packets received by the receiving system (via a NIC associated with the receiving system) are analyzed by a classifier to determine the connection associated with the packet.

Typically, the classifier includes a connection data structure, which includes information about active connections on the receiving system. The connection data structure may include the following information about each active connection: (i) the queue associated with the connection; and (ii) information necessary to process the packets on the queue associated with the connection. Depending on the implementation, the connection data structure may include additional information about each active connection. Such queues are typically implemented as first-in first-out (FIFO) queues and are bound to a specific central processing unit (CPU) on the receiving computer system. Thus, all packets for a given connection are placed in the same queue and are processed by the same CPU. In addition, each queue is typically configured to support multiple connections.

Once the classifier determines the connection associated with the packets, the packets are forwarded to a temporary data structure (e.g., a receive ring on the NIC) and an interrupt is issued to the CPU associated with the queue. In response to the interrupt, a thread associated with the CPU (to which the serialization queue is bound) retrieves the packets from the temporary data structure and places them in the appropriate queue. Once packets are placed in the queue, those packets are processed in due course. In some implementations, the queues are implemented such that only one thread is allowed to access a given queue at any given time.

SUMMARY

In general, in one aspect, the invention relates to a method for receiving incoming packets associated with a virtual Local Area Network (VLAN), comprising receiving an incoming packet, classifying the incoming packet based on a VLAN tag embedded in the incoming packet, wherein the VLAN tag corresponds to the VLAN, and passing the incoming packet to a virtual network interface card (NIC) based on the VLAN tag.

In general, in one aspect, the invention relates to a method for sending outgoing packets associated with a virtual Local Area Network (VLAN), comprising issuing an outgoing packet, receiving the outgoing packet by a virtual network interface card (NIC), wherein the virtual NIC is associated with a VLAN tag, inserting the VLAN tag associated with the virtual NIC into the outgoing packet to obtain a processed outgoing packet, wherein the VLAN tag corresponds to the VLAN, and passing the processed outgoing packet to a NIC.

In general, in one aspect, the invention relates to a system, comprising a network interface card (NIC), and a host comprising a first virtual NIC operatively connected to the NIC, wherein the host is configured to receive an incoming packet via the network interface card (NIC), classify the incoming packet based on a first VLAN tag embedded in the incoming packet, wherein the first VLAN tag corresponds to a first VLAN, and pass the incoming packet to the first virtual NIC based on the first VLAN tag.

Other aspects and of the invention will be apparent from the following description and the appended claims.

DETAILED DESCRIPTION

Figure 1:
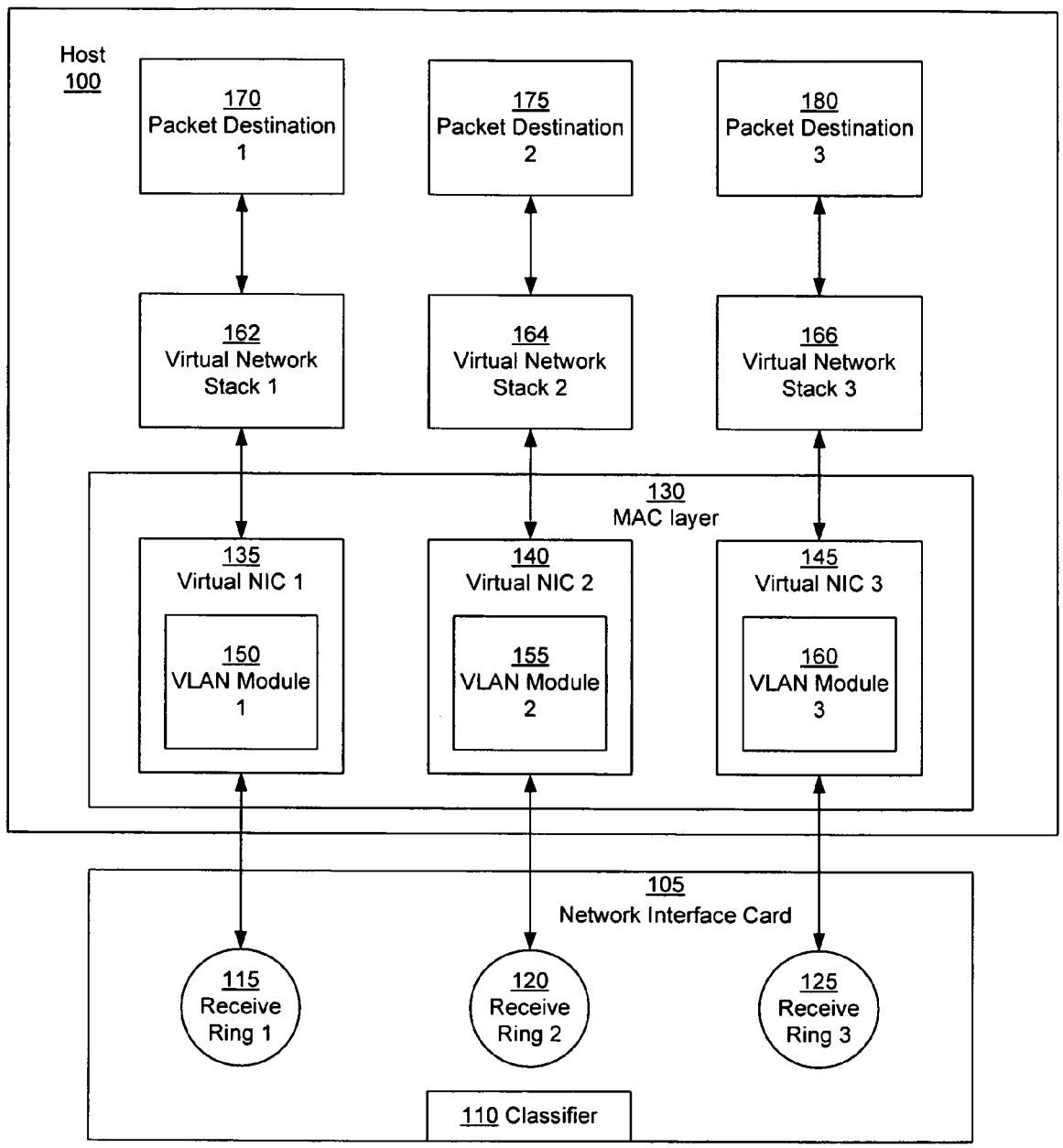
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus to implement Virtual Local Area Networks (LANs) using virtual network interface cards (NICs). A VLAN is a logically independent network. A VLAN may be implemented as a group of physical ports, a group of Media Access Control (MAC) addresses, or as an Internet Protocol (IP) subnet. VLANs are usually implemented using a tagging protocol, such as IEEE 802.1Q.

Further, embodiments of the invention provide a method and apparatus to associate a VLAN with a virtual NIC. Embodiments of the invention allow VLANs to be encapsulated in virtual NICs and managed entirely from virtual NICs, thus eliminating the need for a VLAN layer. As a result, VLANs are managed entirely within the MAC layer; packets are passed directly from the virtual NICs to virtual network stacks without going through any intervening layers. In addition, virtual NICs with VLAN functionality are capable of performing bandwidth control on the VLANs.

In one or more embodiments of the invention, multiple virtual NICs are associated with a physical NIC, each of which is associated with a VLAN(s). In one or more embodiments of the invention, the virtual NIC is responsible for inserting VLAN tags on outbound packets and removing VLAN tags from inbound packets. In one or more embodiments of the invention, a classifier associated with the physical NIC directs incoming packets to virtual NICs based on the contents of their VLAN tags.

FIG. 1 shows a schematic diagram of a system in accordance with one or more embodiments of the invention. As shown in FIG. 1, the system includes a host (100), a NIC (105), multiple virtual NICs (e.g., virtual NIC 1 (135), virtual NIC 2 (140), virtual NIC 3 (145)), a MAC layer (130), multiple virtual network stacks (e.g., virtual network stack 1 (162), virtual network stack 2 (164), virtual network stack 3 (166)), and multiple packet destinations (e.g., packet destination 1 (170), packet destination 2 (175), packet destination 3 (180)). Each of these components is described below.

The NIC (105) provides an interface between the host (100) and a network (not shown) (e.g., a local area network, a wide area network, a wireless network, etc.). More specifically, the NIC (105) includes a network interface (NI) (i.e., the hardware on the NIC used to interface with the network). For example, the NI may correspond to an RJ-45 connector, a wireless antenna, etc. The packets received by the NI are then forwarded to other components on the NIC (105) for processing. In one embodiment of the invention, the NIC (105) includes one or more receive rings (e.g., receive ring 1 (115), receive ring 2 (120), receive ring 3 (125)). In one embodiment of the invention, the receive rings (e.g., receive ring 1 (115), receive ring 2 (120), receive ring 3 (125)) correspond to portions of memory within the NIC (105) used to temporarily store packets received from the network. Further, in one embodiment of the invention, a ring element of the receive rings (e.g., receive ring 1 (115), receive ring 2 (120), receive ring 3 (125)) may point to host memory. In one embodiment of the invention, the classifier (110) is configured to analyze the incoming network traffic, typically in the form of packets, received from the network (not shown).

In one embodiment of the invention, analyzing individual packets includes determining to which of the receive rings (e.g., receive ring 1 (115), receive ring 2 (120), receive ring 3 (125)) each packet is forwarded. In one embodiment of the invention, analyzing the packets by the classifier (110) includes analyzing one or more fields in each of the packets to determine to which of the receive rings (e.g., receive ring 1 (115), receive ring 2 (120), receive ring 3 (125)) the packets are forwarded. As an alternative, the classifier (110) may use the contents of one or more fields in each packet as an index into a data structure that includes information necessary to determine to which receive ring (e.g., receive ring 1 (115), receive ring 2 (120), receive ring 3 (125)) that packet is forwarded. In one or more embodiments of the invention, the classifier (110) uses a VLAN tag embedded in the packet to forward the packet to the appropriate receive ring (e.g., receive ring 1 (115), receive ring 2 (120), receive ring 3 (125)). The classifier (110) may also use other data found in the packet, such as the destination MAC address, to classify the packet. The classifier (110) may be implemented by a separate microprocessor embedded on the NIC (105)). Alternatively, the classifier (110) may be implemented in software stored in memory (e.g., firmware, etc.) on the NIC (105) and executed by a microprocessor on the NIC (105).

In one or more embodiments of the invention, the host (100) may include a device driver (not shown) and one or more virtual NICs (e.g., virtual NIC 1 (135), virtual NIC 2 (140), virtual NIC 3 (145)). In one embodiment of the invention, the device driver provides an interface between the receive rings (e.g., receive ring 1 (115), receive ring 2 (120), receive ring 3 (125)) and the host (100). More specifically, the device driver (not shown) exposes the receive rings (e.g., receive ring 1 (115), receive ring 2 (120), receive ring 3 (125)) to the host (100). In one embodiment of the invention, each of the virtual NICs (e.g., virtual NIC 1 (135), virtual NIC 2 (140), virtual NIC 3 (145)) is associated with one or more receive rings (e.g., receive ring 1 (115), receive ring 2 (120), receive ring 3 (125)). In other words, a virtual NIC (e.g., virtual NIC 1 (130), virtual NIC 2 (135), virtual NIC 3 (140)) receives incoming packets from a corresponding receive ring(s) (e.g., receive ring 1 (115), receive ring 2 (120), receive ring 3 (125)). In one or more embodiments of the invention, outgoing packets are forwarded from a virtual NIC (e.g., virtual NIC 1 (135), virtual NIC 2 (140), virtual NIC 3 (145)) to a corresponding transmit ring (not shown), which temporarily stores the packet before transmitting the packet over the network. In one or more embodiments of the invention, receive rings (e.g., virtual NIC 1 (135), virtual NIC 2 (140), virtual NIC 3 (145)) and transmit rings (not shown) are implemented as ring buffers in the NIC (105). In one or more embodiments of the invention, the MAC layer (130) coordinates the transmission and receipt of packets for the NIC (105) and virtual NICs (e.g., virtual NIC 1 (135), virtual NIC 2 (140), virtual NIC 3 (145)). For example, the MAC layer (130) is responsible for moving packets between the NIC (105) and other physical NICs on other hosts on the network (not shown). In addition, the MAC layer (130) is responsible for moving packets between the NIC (105) and virtual NICs (e.g., virtual NIC 1 (135), virtual NIC 2 (140), virtual NIC 3 (145)), and between the virtual NICs and the virtual network stacks (e.g., virtual network stack 1 (162), virtual network stack 2 (164), virtual network stack 3 (166)).

In one or more embodiments of the invention, the virtual NICs (e.g., virtual NIC 1 (135), virtual NIC 2 (140), virtual NIC 3 (145)) are operatively connected to packet destinations (e.g., packet destination 1 (170), packet destination 2 (175), packet destination 3 (180)), which include containers and applications, via virtual network stacks (e.g., virtual network stack 1 (162), virtual network stack 2 (164), virtual network stack 3 (166)). The virtual NICs (e.g., virtual NIC 1 (135), virtual NIC 2 (140), virtual NIC 3 (145)) provide an abstraction layer between the NIC (105) and the packet destinations (e.g., packet destination 1 (170), packet destination 2 (175), packet destination 3 (180)) on the host (100). More specifically, each virtual NIC (e.g., virtual NIC 1 (135), virtual NIC 2 (140), virtual NIC 3 (145)) operates like a NIC (105). For example, in one embodiment of the invention, each virtual NIC (e.g., virtual NIC 1 (135), virtual NIC 2 (140), virtual NIC 3 (145)) is associated with one or more IP addresses, associated with one or more MAC addresses, associated with one or more ports, and configured to handle one or more protocol types. Thus, while the host (100) may be operatively connected to a single NIC (105), packet destinations (e.g., packet destination 1 (170), packet destination 2 (175), packet destination 3 (180)), such as containers or applications, executing on the host (100) operate as if the host (100) is bound to multiple NICs.

In one embodiment of the invention, each virtual network stack (e.g., virtual network stack 1 (162), virtual network stack 2 (164), virtual network stack 3 (166)) includes functionality to process packets in accordance with various protocols used to send and receive packets (e.g., Transmission Communication Protocol (TCP), Internet Protocol (IP), User Datagram Protocol (UDP), etc.). Further, each virtual network stack may also include functionality, as needed, to perform additional processing on the incoming and outgoing packets. This additional processing may include, but is not limited to, cryptographic processing, firewall routing, etc.

In one or more embodiments of the invention, the virtual network stacks correspond to network stacks with network layer and transport layer functionality. In one embodiment of the invention, network layer functionality corresponds to functionality to manage packet addressing and delivery on a network (e.g., functionality to support IP, Address Resolution Protocol (ARP), Internet Control Message Protocol, etc.). In one or more embodiments of the invention, transport layer functionality corresponds to functionality to manage the transfer of packets on the network (e.g., functionality to support TCP, UDP, Stream Control Transmission Protocol (SCTP), etc.). In one or more embodiments of the invention, the virtual network stacks (e.g., virtual network stack 1 (162), virtual network stack 2 (164), virtual network stack 3 (166)) implement an IP layer (not shown) and a TCP layer (not shown).

In one embodiment of the invention, the virtual NIC (e.g., virtual NIC 1 (135), virtual NIC 2 (140), virtual NIC 3 (145)) may be bound to a virtual machine (e.g., Xen Domain) instead of a virtual network stack (e.g., virtual network stack 1 (162), virtual network stack 2 (164), virtual network stack 3 (166)). In such cases, the virtual NIC is bound to an interface (e.g., a Xen interface), where the interface enables the virtual NIC to communicate with the virtual machine. In one or more embodiments of the invention, the aforementioned virtual machine includes its own virtual network stack and includes its own operating system (OS) instance, which may be different than the OS executing on the host.

As shown in FIG. 1, each virtual NIC (e.g., virtual NIC 1 (135), virtual NIC 2 (140), virtual NIC 3 (145)) contains a VLAN module (e.g., VLAN module 1 (150), VLAN module 2 (155), VLAN module 3 (160)). In one or more embodiments of the invention, the VLAN module (e.g., VLAN module 1 (150), VLAN module 2 (155), VLAN module 3 (160)) within each virtual NIC (e.g., virtual NIC 1 (135), virtual NIC 2 (140), virtual NIC 3 (145)) is responsible for managing a VLAN associated with the virtual NIC. Because VLANs are differentiated at the MAC layer (130), the MAC layer (130) is present both in between the NIC (105) and virtual NICs (e.g., virtual NIC 1 (135), virtual NIC 2 (140), virtual NIC 3 (145)) and between the virtual NICs and the virtual network stacks (e.g., virtual network stack 1 (162), virtual network stack 2 (164), virtual network stack 3 (166)).

In one or more embodiments of the invention, the virtual network stacks (e.g., virtual network stack 1 (162), virtual network stack 2 (164), virtual network stack 3 (166)) associated with the virtual NICs (e.g., virtual NIC 1 (135), virtual NIC 2 (140), virtual NIC 3 (145)) are responsible for implementing bandwidth control for the virtual NICs (e.g., virtual NIC 1 (135), virtual NIC 2 (140), virtual NIC 3 (145)). Those skilled in the art will appreciate that network bandwidth associated with the NIC (105) is divided up among the virtual NICs (e.g., virtual NIC 1 (135), virtual NIC 2 (140), virtual NIC 3 (145)) sharing the NIC (105). Bandwidth control relates to the distribution of bandwidth among the virtual NICs (e.g., virtual NIC 1 (135), virtual NIC 2 (140), virtual NIC 3 (145)). For example, a 10 Gigabit/second network bandwidth may be divided equally among three virtual NICs (e.g., virtual NIC 1 (135), virtual NIC 2 (140), virtual NIC 3 (145)). Alternatively, one virtual NIC (e.g., virtual NIC 1

(135), virtual NIC 2 (140), virtual NIC 3 (145)) may be allotted half the bandwidth, or five Gigabits/second, whereas the other two virtual NICs may be given only one Gigabit/second. Those skilled in the art will appreciate that the network bandwidth does not have to be distributed entirely among the virtual NICs (e.g., virtual NIC 1 (135), virtual NIC 2 (140), virtual NIC 3 (145)); instead, part of the network bandwidth may be reserved for another purpose, such as for allocating to a new virtual NIC upon its creation.

In one or more embodiments of the invention, the virtual network stacks (e.g., virtual network stack 1 (162), virtual network stack 2 (164), virtual network stack 3 (166)) apply bandwidth control to the VLAN by regulating the flow of packets in and out of the virtual NIC. In one embodiment of the invention, the virtual network stacks (e.g., virtual network stack 1 (162), virtual network stack 2 (164), virtual network stack 3 (166)) implement bandwidth control using a polling mode. Specifically, when operating in polling mode, the virtual network stacks (e.g., virtual network stack 1 (162), virtual network stack 2 (164), virtual network stack 3 (166)) are able to request, on a per-virtual NIC basis, the number of packets to obtain from the receive ring associated with the virtual network stack. Accordingly, until the virtual network stack requests a packet(s), the packets remain in the receive ring.

Once the packets have been requested, the packets are passed to the appropriate virtual NIC and then to the virtual network stack for processing. The processed packets are then passed to the appropriate packet destination. As an alternative to polling mode, the virtual network stack may also operate in interrupt mode. In interrupt mode, each time a packet is received by the receive ring, an interrupt is issued and the packet is passed from the receive ring to the corresponding virtual NIC.

In one or more embodiments of the invention, incoming packets are received by the NIC (105) and analyzed by the classifier (110). The packets are classified by the classifier (110) based on a VLAN tag on each packet. The packets are then sent to a corresponding receive ring (e.g., receive ring 1 (115), receive ring 2 (120), receive ring 3 (125)), where they are passed to the virtual NIC (e.g., virtual NIC 1 (135), virtual NIC 2 (140), virtual NIC 3 (145)) linked to the receive ring. At the virtual NIC, the VLAN module (e.g., VLAN module 1 (150), VLAN module 2 (155), VLAN module 3 (160)) of the virtual NIC (e.g., virtual NIC 1 (135), virtual NIC 2 (140), virtual NIC 3 (145)) removes the VLAN tag, performs any additional processing on the packet, and passes the packet to the corresponding virtual network stack (e.g., virtual network stack 1 (162), virtual network stack 2 (164), virtual network stack 3 (166)) for further processing. In one or more embodiments of the invention, the virtual network stack (e.g., virtual network stack 1 (162), virtual network stack 2 (164), virtual network stack 3 (166)) further processes packets associated with a VLAN implemented using an IP subnet.

In one or more embodiments of the invention, outgoing packets are received by a virtual NIC (e.g., virtual NIC 1 (135), virtual NIC 2 (140), virtual NIC 3 (145)) from the virtual network stack (e.g., virtual network stack 1 (162), virtual network stack 2 (164), virtual network stack 3 (166)). The VLAN module (e.g., VLAN module 1 (150), VLAN module 2 (155), VLAN module 3 (160)) in the virtual NIC (e.g., virtual NIC 1 (135), virtual NIC 2 (140), virtual NIC 3 (145)) inserts a VLAN tag into each packet, and the virtual NIC (e.g., virtual NIC 1 (135), virtual NIC 2 (140), virtual NIC 3 (145)) passes the packet to the NIC (105), where the packet is sent to the network (not shown). The inserted VLAN tag allows the packet to be associated with a VLAN; when the packet is received by another network device, such as a router, switch, or other NIC, the VLAN tag enables that device to determine to where the packet should be passed. As stated above, the network device may also use other criteria, such as destination MAC address, to direct the packet along the appropriate path. In one or more embodiments of the invention, the VLAN tag includes a 12-bit VLAN ID that identifies the VLAN to which the packet belongs.

In one or more embodiments of the invention, incoming packets are forwarded from the receive ring (e.g., receive ring 1 (115), receive ring 2 (120), receive ring 3 (125)) to a software ring (not shown). In one or more embodiments of the invention, a software ring is created on top of a receive ring (e.g., receive ring 1 (115), receive ring 2 (120), receive ring 3 (125)) on a NIC (105) when more virtual NICs (e.g., virtual NIC 1 (135), virtual NIC 2 (140), virtual NIC 3 (145)) are required than there are receive rings (e.g., receive ring 1 (115), receive ring 2 (120), receive ring 3 (125)) on the NIC (105). In other words, the lack of physical resources provided by the NIC (105) is resolved by creating a software version of the physical NIC (105) and further routing and storing packets using the software version of the resources.

In one or more embodiments of the invention, a software ring (not shown) is associated with a software classifier and multiple software receive rings. In one or more embodiments of the invention, each of the software receive rings in a software ring is associated with a virtual NIC (e.g., virtual NIC 1 (135), virtual NIC 2 (140), virtual NIC 3 (145)). The software classifier, like the classifier (110) on a NIC (105), receives packets and relays them to the appropriate software receive rings based on the contents of the fields in each packet. In one or more embodiments of the invention, the software classifier on a software ring uses a VLAN tag embedded in each packet to direct packets to software receive rings. For example, if a 12-digit VLAN ID in the VLAN tag corresponds to the VLAN ID of a virtual NIC associated with the software ring, the software classifier forwards the packet to the software receive ring associated with the virtual NIC.

Virtual NICs (e.g., virtual NIC 1 (135), virtual NIC 2 (140), virtual NIC 3 (145)) associated with software receive rings within a software ring are capable of implementing VLAN functionality using VLAN modules (e.g., VLAN module 1 (150), VLAN module 2 (155), VLAN module 3 (160)). Those skilled in the art will appreciate that a software ring, software receive rings associated with the software ring, and virtual NICs (e.g., virtual NIC 1 (135), virtual NIC 2 (140), virtual NIC 3 (145)) operatively connected to the software receive rings are all MAC layer objects. As a result, virtual NICs (e.g., virtual NIC 1 (135), virtual NIC 2 (140), virtual NIC 3 (145)) associated with a software ring can, like their counterparts associated with a NIC (105), perform VLAN control on incoming and outgoing packets. In addition, because software rings can be associated with both receive rings (e.g., receive ring 1 (115), receive ring 2 (120), receive ring 3 (125)) on a NIC (105) and virtual NICs (e.g., virtual NIC 1 (135), virtual NIC 2 (140), virtual NIC 3 (145)), multiple layers of software rings and virtual NICs can be created on top of one another, allowing a potentially unlimited number of VLANs (subject to resource limits such as available CPU and memory) to be supported and managed separately by virtual NICs within one physical host (100).

Figure 2B:
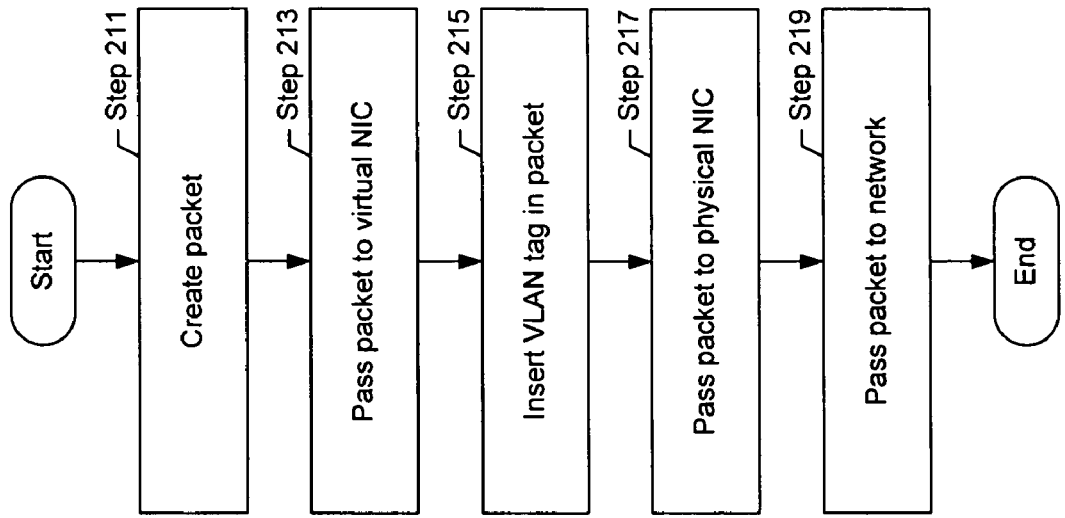
FIGS. 2A and 2B show flow charts in accordance with one or more embodiments of the invention.
Figure 2A:
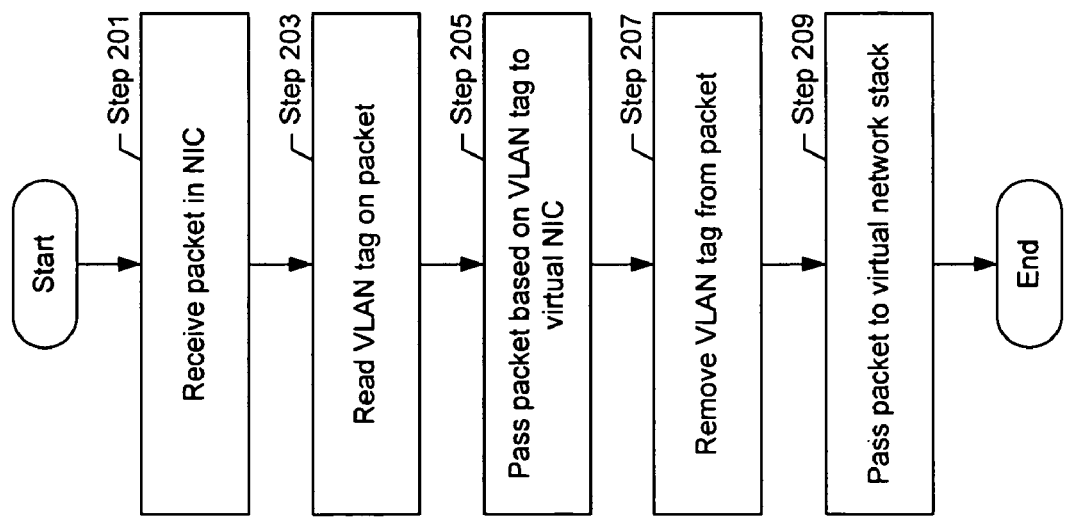

FIG. 2A shows a flow diagram for receiving incoming packets in accordance with one or more embodiments of the invention. Initially, the packet is received by a NIC (Step 201). The VLAN tag embedded in the packet is read (Step 203) by the classifier on the NIC and then passed to the appropriate virtual NIC based on the VLAN tag (Step 205). In one or more embodiments of the invention, the packet is first passed to a receive ring, where the packet is stored until the virtual NIC retrieves the packet.

Once the virtual NIC has received the packet, the virtual NIC removes the VLAN tag from the packet (Step 207). In one or more embodiments of the invention, VLANs are implemented entirely by the virtual NICs. As a result, elements in the path of incoming packets after the virtual NICs (e.g., virtual network stacks, packet destinations, etc.) do not need to be aware of the existence of a VLAN, thus allowing the VLAN tag to be removed from the packet in the virtual NIC. Once the VLAN tag is removed, the packet is passed to the virtual network stack (Step 209), where further processing may take place before the packet is sent to the packet destination.

FIG. 2B shows a flow diagram for sending outgoing packets in accordance with one or more embodiments of the invention. Initially, a packet is created (Step 211). In one or more embodiments of the invention, the packet is created by a container or application and forwarded to a virtual network stack, where the packet is further processed and configured using various protocols, such as Hypertext Transfer Protocol (HTTP), TCP, UDP, and IP. After processing, the packet is passed to the virtual NIC (Step 213), where the virtual NIC inserts a VLAN tag into the packet (Step 215) corresponding to the VLAN managed by the virtual NIC. In one or more embodiments of the invention, the VLAN tag includes a 12-digit VLAN ID, which is used to distinguish members of the VLAN from non-members. The packet is then passed from the virtual NIC to the physical NIC (Step 217), where the packet is passed to the network (Step 219).

Figure 3:
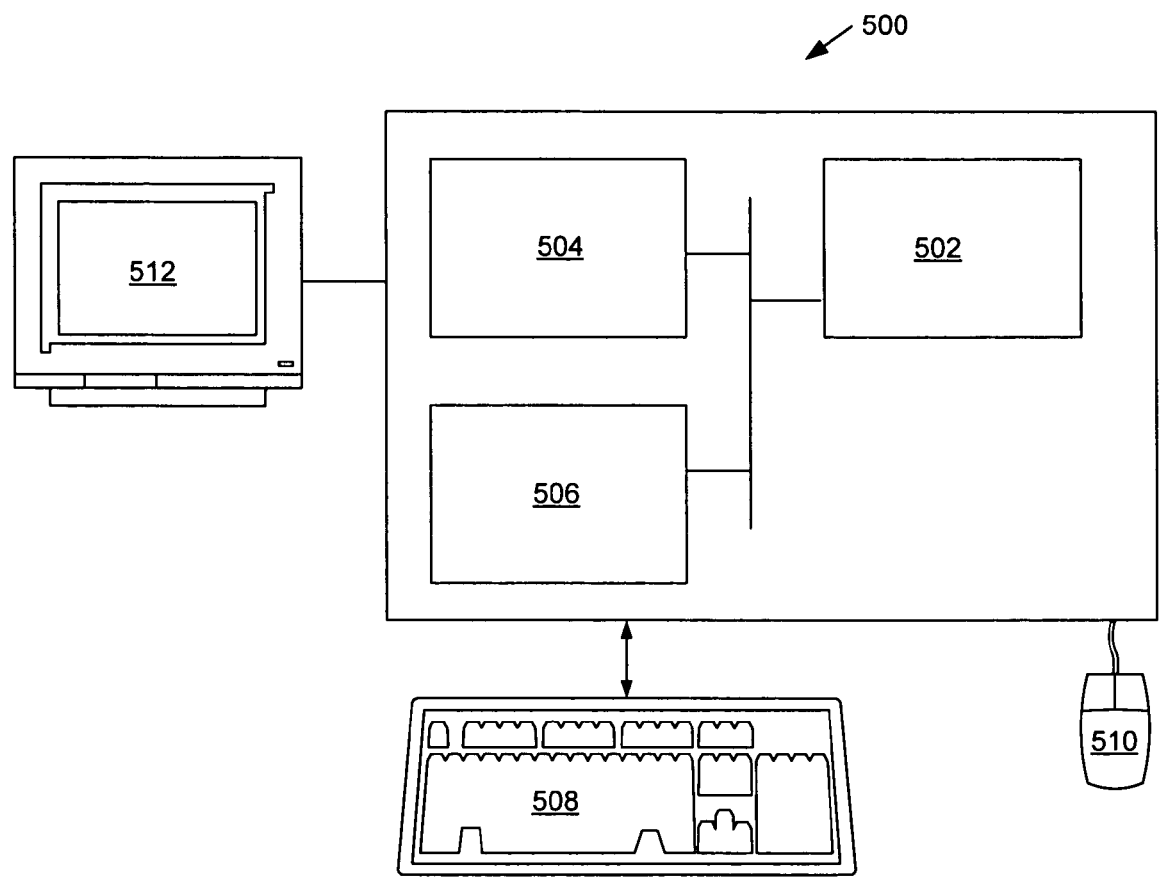
FIG. 3 shows a computer system in accordance with one or more embodiments of the invention.

The invention may be implemented on virtually any type of computer regardless of the platform being used. For example, as shown in FIG. 3, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., NIC, virtual NICs, IP layer, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for receiving incoming packets associated with a virtual Local Area Network (VLAN), comprising:
   receiving an incoming packet;
   classifying the incoming packet based on a VLAN tag embedded in the incoming packet, wherein the VLAN tag corresponds to the VLAN;
   passing the incoming packet to a virtual network interface card (NIC) of a plurality of virtual NICs based on the VLAN tag; and
   passing the processed incoming packet to a virtual network stack of a plurality of virtual network stacks by the virtual NIC, wherein the virtual NIC is associated with the virtual network stack, and
   wherein each of the plurality of virtual NICs and each of a plurality of virtual network stacks execute within the same single operating system on a single host.

2. The method of claim 1, further comprising:
   receiving the incoming packet by the virtual NIC; and
   removing the VLAN tag from the incoming packet by the virtual NIC to obtain a processed incoming packet.

3. The method of claim 1, wherein the virtual network stack comprises an Internet Protocol (IP) layer and a Transport Control Protocol (TCP) layer.

4. The method of claim 1, wherein the virtual network stack implements bandwidth control for a packet destination associated with the virtual network stack.

5. The method of claim 1, wherein the incoming packet is passed, after classification based on the VLAN tag, to a software ring, wherein the software ring comprises a software receive ring associated with the virtual NIC.

6. The method of claim 1, wherein the virtual NIC is located in a Media Access Control (MAC) layer of a host.

7. A method for sending outgoing packets associated with a virtual Local Area Network (VLAN), comprising:
   issuing an outgoing packet;
   receiving the outgoing packet from a virtual network stack of a plurality of virtual network stacks by a virtual network interface card (NIC) of a plurality of virtual NICs, wherein the virtual NIC is associated with a VLAN tag;
   inserting, by the virtual NIC, the VLAN tag associated with the virtual NIC into the outgoing packet to obtain a processed outgoing packet, wherein the VLAN tag corresponds to the VLAN; and
   passing the processed outgoing packet to a NIC,
   wherein each of the plurality of virtual NICs and each of the plurality of virtual network stacks execute within the same single operating system on a single host.

8. The method of claim 7, further comprising:
   passing the processed outgoing packet to a network using the NIC.

9. The method of claim 7, wherein the virtual NIC is associated with a Media Access Control (MAC) layer of a host.

10. The method of claim 7, wherein the virtual network stack comprises an Internet Protocol (IP) layer and a Transport Control Protocol (TCP) layer.

11. A system, comprising:
    a network interface card (NIC); and
    a host comprising:
       a plurality of virtual network stacks;
       a plurality of virtual NICs operatively connected to the NIC,
       wherein each of the plurality of virtual NICs and each of the plurality of virtual network stacks execute within the same single operating system on the host, wherein the host is configured to:

receive an incoming packet via the network interface card (NIC);

classify the incoming packet based on a first VLAN tag embedded in the incoming packet, wherein the first VLAN tag corresponds to a first VLAN;

pass the incoming packet to a first virtual NIC of the plurality of virtual NICs based on the first VLAN tag; and pass the processed incoming packet to a virtual network stack of the plurality of virtual network stacks from the first virtual NIC.

12. The system of claim 11, wherein the first virtual NIC is configured to:

receive the incoming packet from the NIC; and remove the first VLAN tag from the incoming packet to obtain a processed incoming packet.

13. The system of claim 11, wherein the virtual network stack comprises an Internet Protocol (IP) layer and a Transport Control Protocol (TCP) layer.

14. The system of claim 11, wherein the virtual network stack implements bandwidth control for a packet destination associated with the virtual network stack.

15. The system of claim 11, wherein the first virtual NIC is associated with a Media Access Control (MAC) layer of the host.

16. The system of claim 11, wherein the incoming packet is forwarded, after classification based on the first VLAN tag, to a software ring, wherein the software ring comprises a software receive ring associated with the first virtual NIC.

17. The system of claim 11, wherein the host further comprises a packet destination configured to issue an outgoing packet, wherein the packet destination is associated with a second VLAN, and a second virtual NIC of the plurality of virtual NICs, wherein the second virtual NIC is configured to:

receive the outgoing packet;

insert a second VLAN tag into the outgoing packet to obtain a processed outgoing packet, wherein the second VLAN tag corresponds to the second VLAN; and pass the processed outgoing packet to the NIC.

* * * * *